United States Patent [19]
Eom

[11] Patent Number: 6,055,083
[45] Date of Patent: Apr. 25, 2000

[54] OPTICAL SCANNING UNIT MODULE AND OPTICAL SCANNING SYSTEM ADOPTING THE SAME

[75] Inventor: Yoon-seop Eom, Suwon, Rep. of Korea

[73] Assignee: Samsung Electronics Co., Ltd., Kyungki-Do, Rep. of Korea

[21] Appl. No.: 09/115,595

[22] Filed: Jul. 15, 1998

[30] Foreign Application Priority Data

Jul. 31, 1997 [KR] Rep. of Korea ............... 97-36548

[51] Int. Cl.⁷ .................................................. G02B 26/08
[52] U.S. Cl. .................. 359/203; 359/201; 359/204; 359/216; 347/115
[58] Field of Search ................................ 359/197, 198, 359/199, 200, 201, 203, 204, 216, 217, 218; 347/115, 116, 117, 118, 232

[56] References Cited

U.S. PATENT DOCUMENTS 5,774,630 6/1998 Lee et al. ............................ 395/13

*Primary Examiner*—Cassandra Spyrou
*Assistant Examiner*—Euncha Cherry
*Attorney, Agent, or Firm*—Sughrue, Mion, Zinn, Macpeak & Seas, PLLC

[57] ABSTRACT

An optical scanning system for a printer including a shaft rotated by a driving unit, a plurality of rotary polygon mirrors installed on the shaft and spaced apart by a predetermined distance, a plurality of light sources for emitting light beams to each of the rotary polygon mirrors, a plurality of lens units for focusing the light beams reflected by the respective rotary polygon mirrors on a circulating photoreceptor belt, a plurality of photodetectors for receiving one of the beams approaching an edge of the photoreceptor belt and outputting electrical signals corresponding to the receiving of the one of the beams, and a system controller for receiving the signals output by the photodetectors and controlling operation of the light sources and the driving unit.

5 Claims, 3 Drawing Sheets

6,055,083

OPTICAL SCANNING UNIT MODULE AND OPTICAL SCANNING SYSTEM ADOPTING THE SAME

BACKGROUND OF THE INVENTION

1. Field of the Invention

The present invention relates to an optical scanning unit module and an optical scanning system for a printer using such a module, and more particularly, to an optical scanning unit module for simultaneously scanning a plurality of beams in different directions, and to an optical scanning system for a printer using such a module.

2. Description of the Related Art

Referring to the printer shown in FIG. 1, a reset device 15, optical scanning units 30, developing units 17, a drying unit 18, and a transfer device 20 are disposed around a circulation path of a photoreceptor belt 14 moving around three rollers 11, 12, and 13.

When printing is performed, the optical scanning units 30 scan light beams to the photoreceptor belt 14. An electrostatic latent image is formed on the photoreceptor belt 14 by the optical scanning units 30 for scanning beams having different color information, and then, the electrostatic latent image is developed by developing solution supplied by the developing units 17 for developing the image using a developer corresponding to the color information of the scanned beam, thus forming a color image on the photoreceptor belt 14. The color image formed on the photoreceptor belt 14 by the developer passes through the drying unit 18, as the photoreceptor belt 14 continues to circulate, and is transferred to a transfer roller 21 rotating by being partially engaged with the photoreceptor belt 14. Subsequently, the image on the transfer roller 21 is transferred to print paper 23 by the rotation of the transfer roller 21 and a press roller 22 with the print paper 23 interposed therebetween.

In the printing operation described above, the four optical scanning units 30 scan beams having color information corresponding to yellow, magenta, cyan, and black colors, respectively.

FIG. 2 shows a conventional optical scanning unit 30, which includes a light source 31, rotary polygon mirror 32, a motor 36, and a lens unit 33. A system controller 35 controls a beam scanning period of the optical scanning units 30 which scan light beams to the photoreceptor belt 14 at a set position in a widthwise direction of the photoreceptor belt 14.

A photodetector 34, which is disposed to receive a light beam scanned beyond the edge of the photoreceptor belt 14, outputs a pulse signal corresponding to a detection of the beam to the system controller 35. The system controller 35 determines a falling edge of the pulse signal as the point in time that the scanned beam reaches the edge of the photoreceptor belt 14, delays emission of a light beam for recording image information until the beam is scanned from the edge of the photoreceptor belt 14 to a set image information recording area D, and then drives the light source 31 to emit the beam for recording the image information.

According to the conventional technology, the system controller 35 controls synchronization of each light source 31 and each motor driver 37 such that the leading edges and positions of the beams scanned by the respective optical scanning units 30 are coincident with the set area of the circulating photoreceptor belt 14. Accordingly, a control circuit for controlling the synchronization of the driving of each motor 36 and each light source 31 is complicated.

In order to overcome the above described complication, it is possible to use a single optical scanning unit and rotate the photoreceptor belt four times for one print. However, the printing speed is lowered by this method. Another solution is to use each reflecting surface of a rotary polygon mirror having a plurality of reflecting surfaces. In other words, a plurality of beams are emitted to different reflecting surfaces of a single rotary polygon mirror, and the beams are reflected by the respective reflecting surfaces to a photoreceptor via an optical means. However, in this method, since optical paths are different for each light beam, an additional controlling means is required to control the beam power and spot size, thereby complicating the system.

SUMMARY OF THE INVENTION

To solve the above problems, it is an objective of the present invention to provide an optical scanning unit module having a simple structure to scan beams in different directions and to easily control the scanning of each light beam, and an optical beam scanning system for a printer adopting such a module.

Accordingly, to achieve the above objective, there is provided an optical scanning unit module comprising a shaft rotated by a driving unit, a plurality of rotary polygon mirrors installed on the shaft and spaced apart by a predetermined distance, a plurality of light sources for emitting light beams to each of the rotary polygon mirrors, and a plurality of lens units for focusing the light beams reflected by the respective rotary polygon mirrors in the scanning direction.

Also, to achieve the above objective, there is provided an optical scanning system for a printer comprising a shaft rotated by a driving unit, a plurality of rotary polygon mirrors installed on the shaft and spaced apart by a predetermined distance, a plurality of light sources for emitting light beams to each of the rotary polygon mirrors, a plurality of lens units for focusing the light beams reflected by the respective rotary polygon mirrors on a circulating photoreceptor belt, a plurality of photodetectors for receiving one of the beams approaching an edge of the photoreceptor belt and outputting electrical signals corresponding to the receiving of the one of the beams, and a system controller for receiving the signals output by the photodetectors and controlling the operation of the light sources and the driving unit.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

Figure 1:
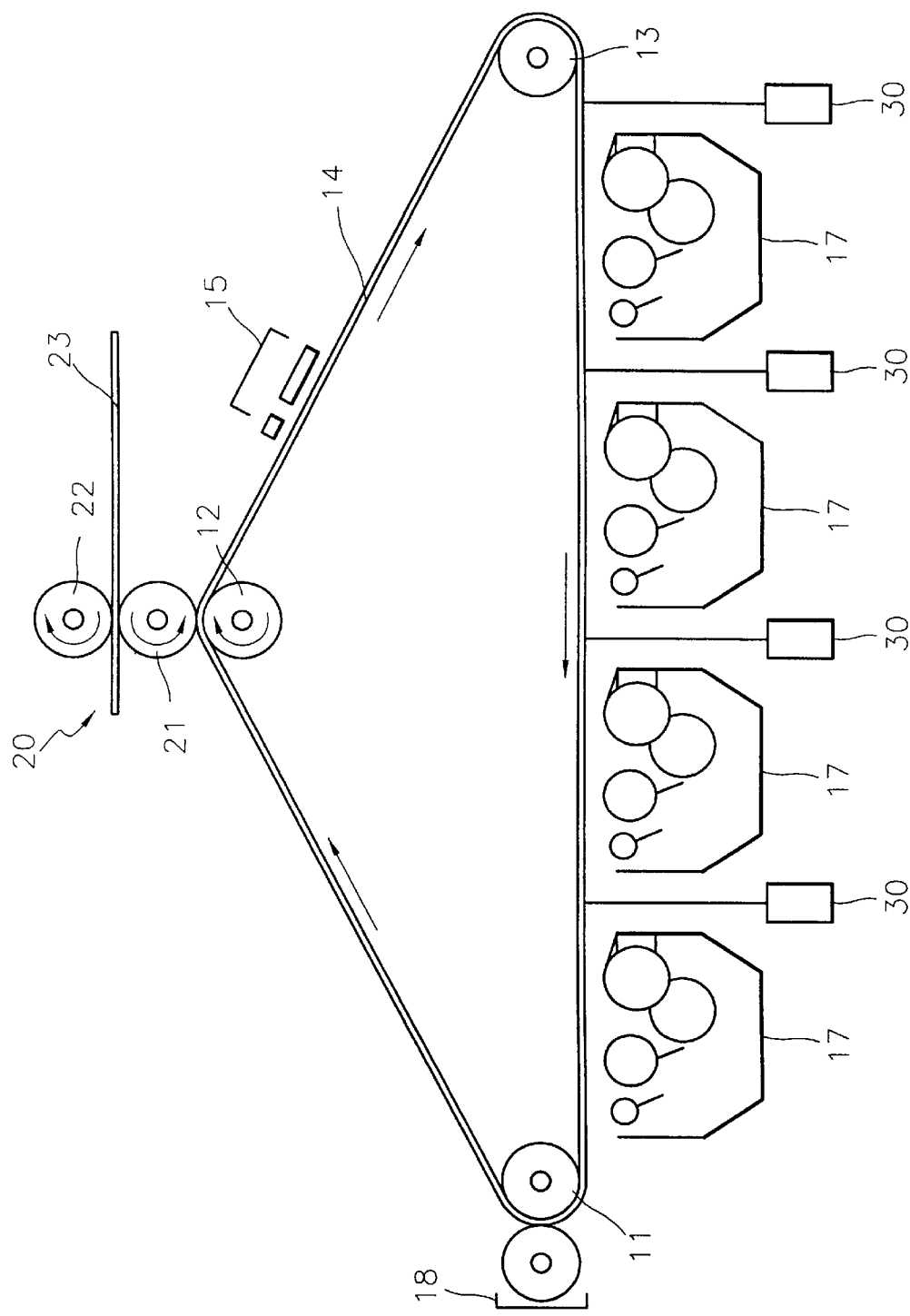
FIG. 1 is a sectional view illustrating a printer.
Figure 2:
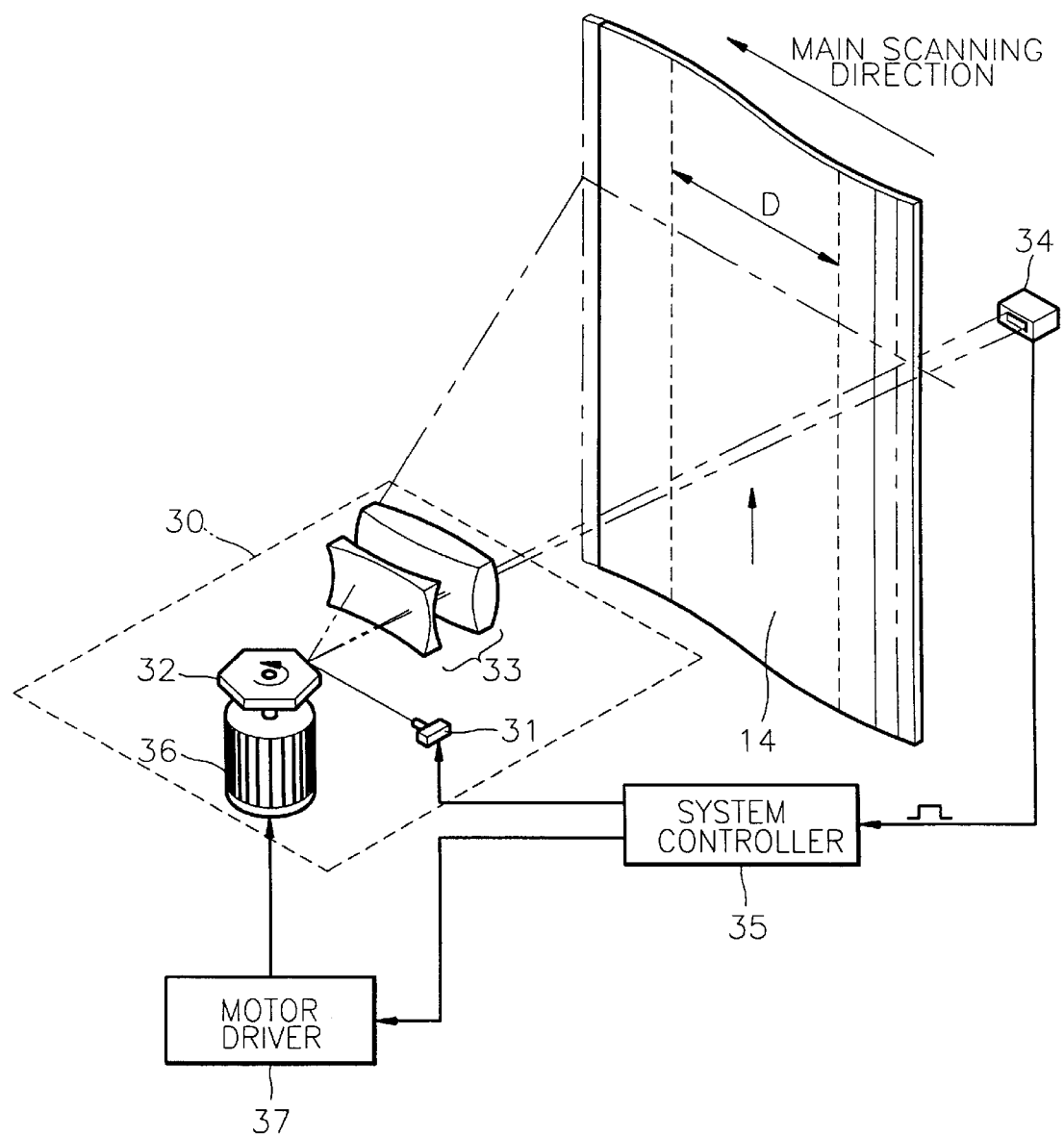
FIG. 2 is a perspective view illustrating a conventional optical scanning unit that can be used in the printer shown in FIG. 1.
Figure 3:
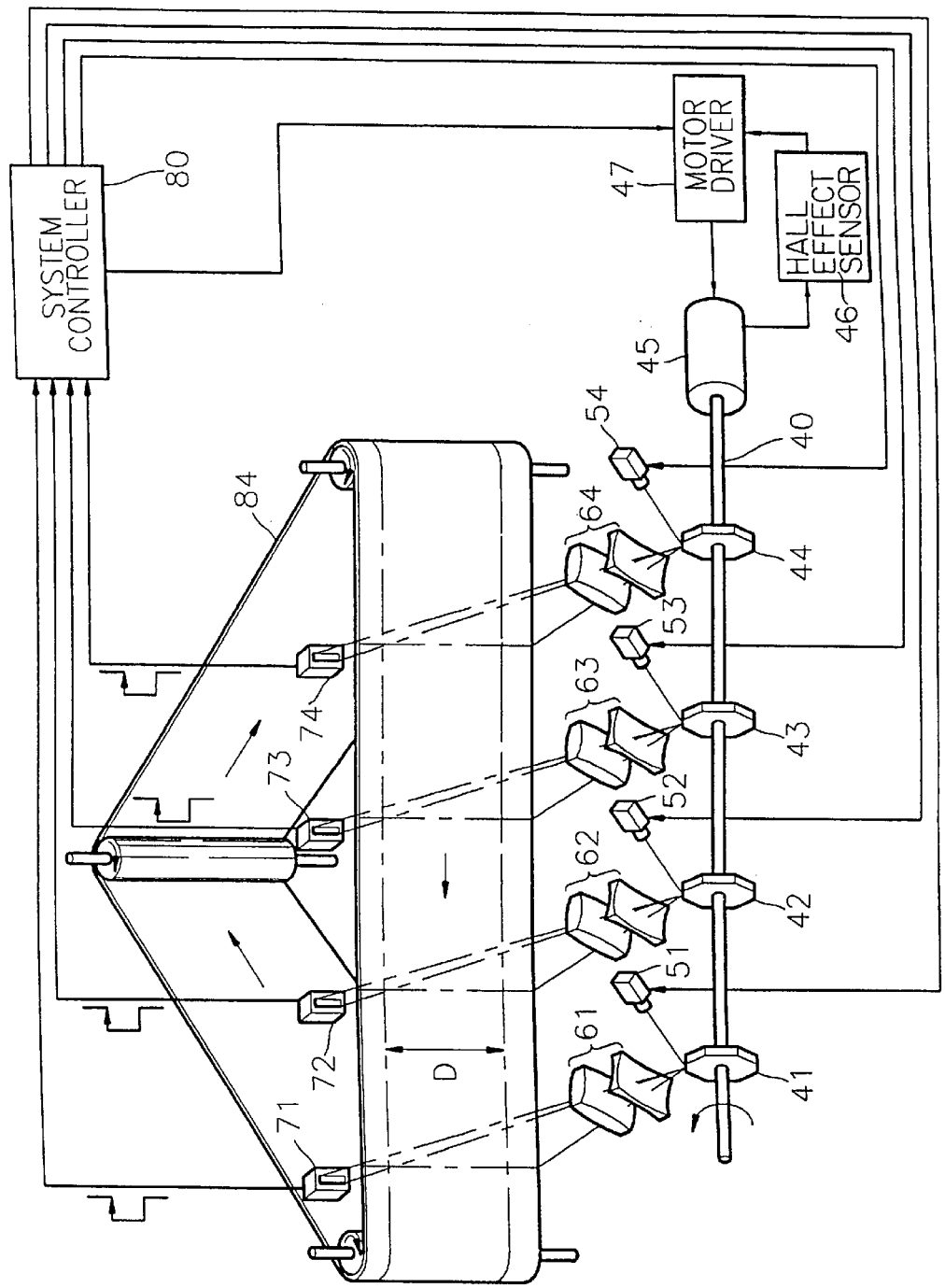
FIG. 3 is a perspective view illustrating an optical scanning system for a printer adopting an optical scanning unit module according to the present invention.

Referring to FIG. 3, an optical scanning unit module according to the present invention includes four rotary polygon mirrors 41 through 44 installed a predetermined distance apart from each other on a shaft 40, four light sources 51 through 54 for emitting light beams to the rotary polygon mirrors 41 through 44, respectively, and four lens units 61 through 64 for focusing each light beam in a main scanning direction.

A collimating lens (not shown) for converting an incident light beam into a parallel beam and a cylindrical lens (not shown) for transmitting a light beam in a main scanning direction while converging a light beam in a sub-scanning direction can be provided along the optical path between the respective light sources 51 through 54 and the respective rotary polygon mirrors 41 through 44.

The main scanning direction refers to a widthwise direction of a photoreceptor belt 84, and the sub-scanning direction is a moving direction of the photoreceptor belt 84 which is perpendicular to the main scanning direction.

The lens units 61 through 64 each having at least one f-θ lens compensate for differences in the optical path of each light beam deflected by the rotary polygon mirrors 41 through 44 and focus incident light beams in the main scanning direction.

Photodetectors 71 through 74 associated with the respective light sources 51 through 54 receive the light beams before the beams emitted from the light sources 51 through 54 reach the edge of the photoreceptor belt 84 and output an electrical signal corresponding thereto, such as pulse signals for example, to a system controller 80.

The system controller 80 determines a falling edge of each pulse signal provided by the photodetectors 71 through 74 as the point in time that the scanned light beam reaches the edge of the photoreceptor belt 84, delays emission of a beam for recording image information until the beam is scanned from the edge of the photoreceptor belt 84 to a set image information recording area D, and then drives the light sources 51 through 54 to emit the beam for recording image information.

The system controller 80 controls the driving time of the respective light sources 51 through 54 so that the leading edge of scanned beams emitted by each light source for recording image information coincides with the set area on the photoreceptor belt 84 for each scan line.

A motor driver 47 drives a motor 45 to rotate the rotary polygon mirrors 41 through 44 collectively at a speed required by the system controller 80. The motor driver 47 more precisely controls the rotation of the motor 45 at a constant speed by using an output signal of a Hall effect sensor 46 for detecting a rotational speed of the motor 45.

The operation of the optical scanning unit module having the above structure is as follows.

Beams emitted from the respective light sources 51 through 54 are periodically deflected by rotation of the rotary polygon mirrors 41 through 44. The photodetectors 71 through 74 receive the light beams that are scanned beyond the edge of the photoreceptor belt 84 and output pulse signals corresponding to the detection of the beams to the system controller 80. When the pulse signal is received, the system controller 80 stops driving the corresponding one of the light sources 51 through 54, counts the scanning time until the beam is scanned from the edge of the photoreceptor belt 84 to the image information recording area D, and drives the corresponding one of the light sources 51 through 54 to emit beams for recording image information. The adjustment of a beam emission period of each light source 51 through 54 for recording the image information is performed independently in the above manner. As a result, the start of optical scanning of image information at the start position in the image information recording area D can always be synchronized on the circulating photoreceptor belt 84.

As described above, in the optical scanning unit module of the present invention and the optical scanning system for a printer using such a module, the start of optical scanning of image information is easily controlled. Also, a plurality of the rotary polygon mirrors are driven by a single driving means, thereby reducing manufacturing costs.

What is claimed is:

1. An optical scanning unit module comprising:

a shaft;

a driving unit for rotating said shaft;

a plurality of rotary polygon mirrors installed on said shaft and spaced apart by a predetermined distance;

a plurality of light sources for emitting light beams to each of said rotary polygon mirrors; and a plurality of lens units for focusing the light beams reflected by respective ones of said rotary polygon mirrors.

2. An optical scanning system for a printer comprising:

a shaft;

a driving unit for rotating said shaft;

a plurality of rotary polygon mirrors installed on said shaft and spaced apart by a predetermined distance;

a plurality of light sources for emitting light beams to each of said rotary polygon mirrors;

a photoreceptor belt and rollers for movably supporting said belt;

a plurality of lens units for focusing the light beams reflected by respective ones of said rotary polygon mirrors on said photoreceptor belt;

a plurality of photodetectors for receiving one of the beams approaching an edge of said photoreceptor belt and outputting electrical signals corresponding to the receiving of said one of the beams; and a system controller for receiving the signals output by said photodetectors and controlling operation of said light sources and said driving unit.

3. The optical scanning system for a printer claimed in claim 2, wherein said driving unit comprises:

a motor; and a motor driver for driving said motor under control of said system controller.

4. The optical scanning system for a printer claimed in claim 3, wherein said driving unit further comprises a Hall effect sensor for detecting a rotational speed of said motor and outputting rotational speed information to said motor driver.

5. The optical scanning system for a printer claimed in claim 2, wherein said system controller controls said light sources to delay emission of the light beams for recording image information until the beams are aligned with a predetermined information recording area.

* * * * *